UNITED STATES PATENT OFFICE.

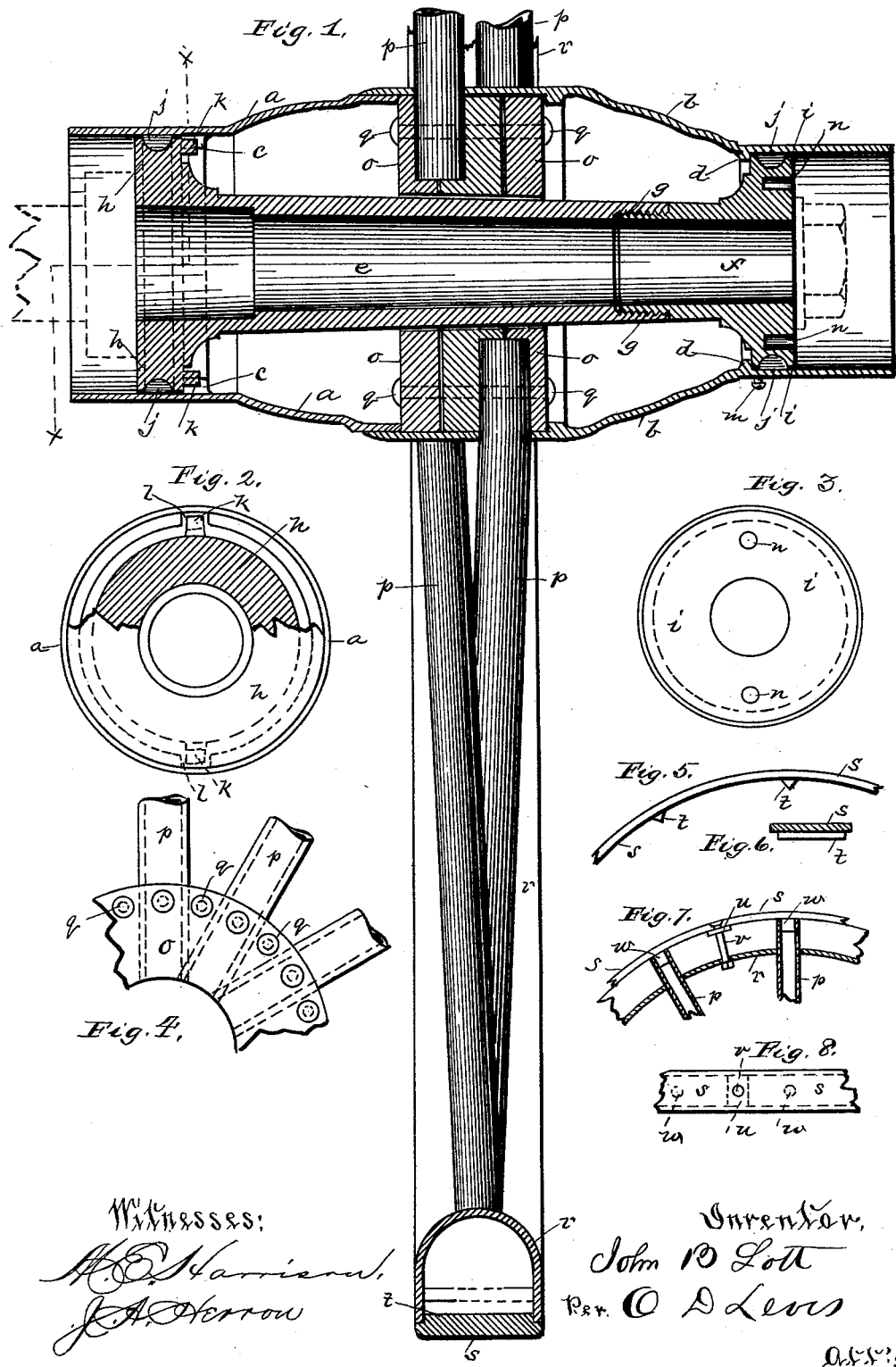

JOHN B. LOTT, OF KITTANNING, PENNSYLVANIA.

VEHICLE-WHEEL.

SPECIFICATION forming part of Letters Patent No. 415,364, dated November 19, 1889.

Application filed June 19, 1889. Serial No. 314,857. (No model.)

*To all whom it may concern:*

Be it known that I, JOHN B. LOTT, a citizen of the United States, residing at Kittanning, in the county of Armstrong and State of Pennsylvania, have invented certain new and useful Improvements in Vehicle-Wheels; and I do hereby declare the following to be a full, clear, and exact description of the invention, such as will enable others skilled in the art to which it pertains to make and use the same, reference being had to the accompanying drawings, which form a part of this specification.

My invention relates to an improvement in vehicle-wheels; and it consists in a metallic hub fitted with tubular spokes, a means for securing the said spokes in the hub, and a device for attaching the tire to the felly, together with certain other details of construction and combination of parts, as will be fully described hereinafter.

In the accompanying drawings, Figure 1 is a sectional elevation of my improved vehicle-wheel constructed in accordance with my invention. Fig. 2 is an inner end elevation of the hub, partly shown in section. Fig. 3 is an outer end elevation of the hub. Fig. 4 is a side elevation of a portion of the socket in which the inner end of the tubular spokes are secured. Fig. 5 is an edge view of the tire. Fig. 6 is an end sectional elevation of the same. Fig. 7 is an edge view of a modification of the tire, in which two methods of attaching the tire to the felly are shown. Fig. 8 is a plan view of the same.

To put my invention into practice, I form from a thin metallic plate two sections $a$ $b$, forming the outer shell of the hub, each being provided with an inwardly-projecting bead $c$ $d$, against which the journal-box finds a bearing. This journal-box is formed in two sections $e$ $f$ and joined together by a screw-thread $g$. At the outer extremity of each of these sections $e f$ is formed an outwardly-extending flange $h$ $i$, each of which is provided with a deep annular groove $j$, formed about its perimeter, for the purpose of placing therein a suitable rubber washer for giving the wheel sufficient elasticity. These two flanges $h$ $i$ with these washers are a neat fit in the shell $a$ $b$ of the hub, and serve the double purpose of centering the box $e$ $f$ and confining the two sections $a$ $b$ of the shell rigidly together.

Formed on the inner side of the flange $h$ are two projections, which enter two recesses $k$, formed in the bead $c$, and serve to prevent the box $e$ $f$ from revolving inside the shell $a$ $b$. A small set-screw $m$, passed through the shell $b$ and into the flange $i$ of the front section $f$ of the box, serves to prevent the same from becoming detached. This section $f$ of the box is provided with two small openings $n$, which admit a suitable wrench for the purpose of detaching the several parts of the hub. The central socket $o$ may be formed of a solid annular casting, if desired, or in two or more sections, as shown at Fig. 1 on the drawings, and the spokes $p$, attached rigidly in position by transverse bolts or rivets $q$. The felly $r$ of this wheel consists of a U-shaped annular ring having the spokes $p$ and tire $s$ fitted thereto. This tire consists of a band of metal $s$, having on its inner surface projecting portions $t$, which serve to center and confine the tire to the U-shaped felly.

At Figs. 7 and 8 on the drawings I have shown two modified means of attaching the tire to the felly, one of which consists of small cylindrical pieces $w$, attached to the tire $s$ and projecting into the open ends of the tubular spokes $p$. The other modification consists in a small plate $u$, attached to the bolt $v$, which passes through the tire $s$ and felly $r$ for the purpose of securing the two together.

Having thus described my invention, what I claim, and desire to secure by Letters Patent, is—

1. In a metallic vehicle-wheel such as described, the combination consisting of the sectional shell $a$ $b$, having formed on its inner periphery two beads $c$ $d$, the journal-box formed in two sections $e$ $f$ and attached together, the outwardly-projecting flanges $h$ $i$, formed integral with the journal-box, the annular grooves $j$ for washers, and the socket-ring $o$, formed of one or more sections, and suitable bolts or rivets to attach the same together, substantially as described.

2. In a vehicle-wheel hub, the combination of a journal-box formed of two aligned separable sections, each having an annular integral flange at its outer extremity, the sectional casing $a\ b$, fitted around but out of contact with said journal-box and provided with the internal beads, which contact laterally with the annular flanges on the journal-box, the packings intermediate of said annular flanges and the journal-box, and the central socket or core fitted on the journal-box to receive the spokes, substantially as described.

3. In a metallic vehicle-wheel, the combination of the journal-box formed of two aligned separable sections, each having an integral annular flange at its outer end, the flange of one section being provided with transverse recesses or openings, the hollow case or shell fitted over said journal-bearing and having the internal beads which impinge laterally against said annular flanges, one of the beads having projections which enter the corresponding recesses or openings in the annular flanges of one member of said journal-box, and the other section of said case or shell having a set-screw which bears against the other section of the journal-box, substantially as described, for the purpose set forth.

4. In a metallic vehicle-wheel, the combination of a felly substantially U-shaped in cross-section, the tubular spokes passing through said felly and terminating between the sides thereof, substantially flush with the perimeter of the same, and a tire $s$, fitted tightly over the felly and having the transverse ribs $t$, which fit between the sides of the felly and the solid projections $w$, that enter the outer extremities of the tubular spokes, substantially as described.

In testimony that I claim the foregoing I hereunto affix my signature this 17th day of June, A. D. 1889.

JOHN B. LOTT. [L. S.]

In presence of—
M. E. HARRISON,
JOHN C. THOMPSON.